United States Patent
Cai et al.

(10) Patent No.: US 10,470,238 B2
(45) Date of Patent: Nov. 5, 2019

(54) POWER SAVING FOR TIGHT COUPLED INTERWORKING

(71) Applicant: BlackBerry Limited, Waterloo (CA)

(72) Inventors: Zhijun Cai, Ashburn, VA (US); James Randolph Winter Lepp, Ottawa (CA); Eswar Vutukuri, Hampshire (GB)

(73) Assignee: BlackBerry Limited, Waterloo, Ontario (CA)

( * ) Notice: Subject to any disclaimer, the term of this patent is extended or adjusted under 35 U.S.C. 154(b) by 326 days.

(21) Appl. No.: 14/542,278

(22) Filed: Nov. 14, 2014

(65) Prior Publication Data

US 2016/0143085 A1 May 19, 2016

(51) Int. Cl.
*H04W 76/28* (2018.01)
*H04W 52/02* (2009.01)
*H04W 84/12* (2009.01)

(52) U.S. Cl.
CPC ....... *H04W 76/28* (2018.02); *H04W 52/0216* (2013.01); *H04W 52/0235* (2013.01); *H04W 84/12* (2013.01); *Y02D 70/00* (2018.01); *Y02D 70/1242* (2018.01); *Y02D 70/1262* (2018.01); *Y02D 70/1264* (2018.01);
(Continued)

(58) Field of Classification Search
CPC ........... H04W 76/048; H04W 52/0216; H04W 52/0235; H04W 84/12
See application file for complete search history.

(56) References Cited

U.S. PATENT DOCUMENTS

2008/0225768 A1* 9/2008 Wentink ............ H04W 52/0216
370/311

2012/0082140 A1* 4/2012 Lin .................. H04W 72/1215
370/336
(Continued)

FOREIGN PATENT DOCUMENTS

| EP | 2632209 | 8/2013 |
|---|---|---|
| EP | 2716112 | 4/2014 |
| WO | 2013/113143 | 8/2013 |

OTHER PUBLICATIONS

Kiminki, Sami; Hirvisalo, Vesa Coexistence-aware scheduling for LTE and WLAN during hard in-device interference. Cognitive Radio Oriented Wireless Network and Communications Conference Jun. 18-20, 2012.*
Lei and Nilsson "A power management scheme for the IEEE 802.1 based WLANs" IEEE International Performance, Computing and Communications Conference 2005 (Year: 2005).*
(Continued)

*Primary Examiner* — Jeffrey M Rutkowski
*Assistant Examiner* — Basil Ma
(74) *Attorney, Agent, or Firm* — Fish & Richardson P.C.

(57) ABSTRACT

In some implementations, a power saving method includes receiving, from a base station, at a user equipment (UE), a Discontinuous Reception (DRX) configuration. The UE determines a WLAN listen interval that includes at least one Traffic Indication Map (TIM) period and at least one TIM transmission period. The UE selects, based on the DRX configuration, a TIM message to monitor within an associated TIM transmission period from the at least one TIM transmission period in the listen interval. The UE determines a WLAN wakeup time that overlaps the associated TIM transmission period. During the associated TIM transmission periods, the UE receives, from an Access Point (AP), the selected TIM message.

21 Claims, 8 Drawing Sheets

(52) U.S. Cl.
CPC .......... *Y02D 70/142* (2018.01); *Y02D 70/146* (2018.01); *Y02D 70/24* (2018.01); *Y02D 70/26* (2018.01)

(56) References Cited

U.S. PATENT DOCUMENTS

| | | | | |
|---|---|---|---|---|
| 2012/0164948 A1* | 6/2012 | Narasimha | H04W 72/1215 | 455/63.1 |
| 2012/0170557 A1* | 7/2012 | Tsfati | H04W 72/1215 | 370/338 |
| 2013/0088983 A1* | 4/2013 | Pragada | H04W 16/14 | 370/252 |
| 2013/0114583 A1* | 5/2013 | Park | H04W 52/0216 | 370/338 |
| 2013/0225068 A1* | 8/2013 | Kiminki | H04W 52/0216 | 455/39 |
| 2014/0211680 A1* | 7/2014 | Seok | H04W 52/0216 | 370/311 |
| 2015/0063182 A1* | 3/2015 | Wang | H04W 72/1215 | 370/311 |
| 2015/0195849 A1* | 7/2015 | Bashar | H04W 16/14 | 370/330 |
| 2016/0157164 A1* | 6/2016 | Lee | H04W 76/27 | 370/329 |

OTHER PUBLICATIONS

3GPP TS 36.321, Version 11.5.0, Release 11; LTE; Evolved Universal Terrestrial Radio Access (E-UTRA); Medium Access Control (MAC) protocol specification.
RP-111094, Discussions on Carrier Aggregation across LTE and 802.11, Intel Corporation, 3GPP TSG-RAN meeting #53, Fukuoka, Japan, Sep. 13-16, 2011.
IEEE STD 802.11-2012, Institute of Electrical and Electronics Engineers Standards Association; IEEE Standard for Information technology—Telecommunications and information exchange between systems Local and metropolitan networks—Specific requirements; Part 11: Wireless LAN Medium Access Control (MAC) and Physical Layer (PHY) Specifications area.
Wi-Fi Alliance, "Wi-Fi Multimedia Technical Specification (with WMM-Power Save and WMM-Admission Control)," Version 1.2.0.
Gast, Matthew S., "802.11 Wireless Networks: The Definitive Guide," Second Edition, O'Reilly.
Extended European Search Report issued in European Application No. 15194390.9 dated Apr. 20, 2016.
Communication Pursuant to Article 94(3) EPC issued in European Application No. 15194390.9 dated Jul. 17, 2017; 3 pages.
Communication Pursuant to Article 94(3) EPC issued in European Application No. 15194390.9 dated Mar. 14, 2018, 8 pages.
Communication under Rule 71(3) EPC issued in European Application No. 15194390.9 dated Mar. 12, 2019, 7 pages.

* cited by examiner

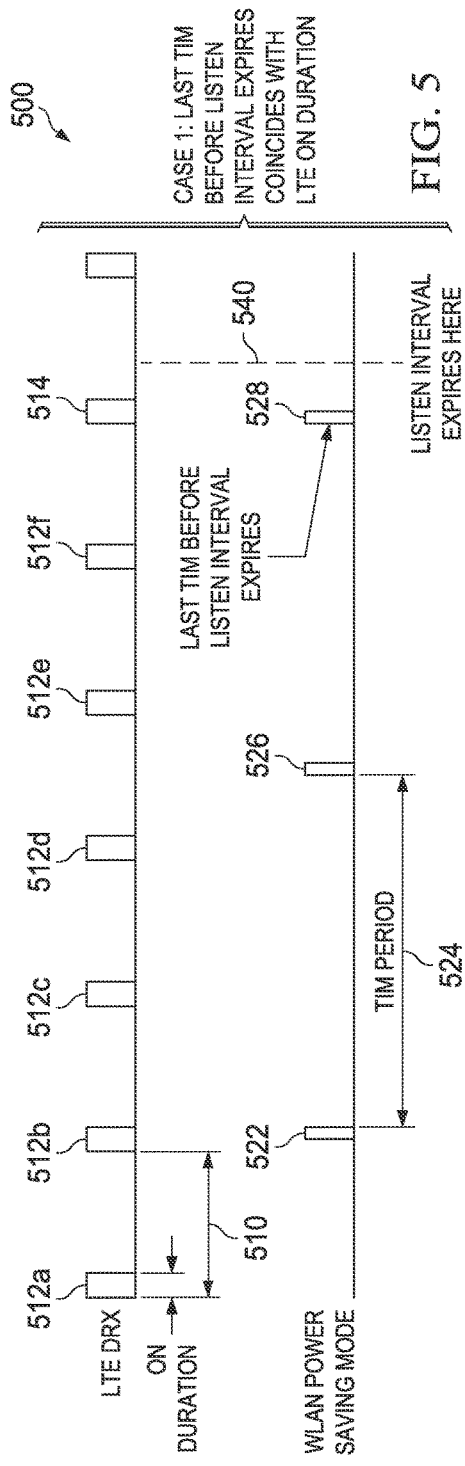
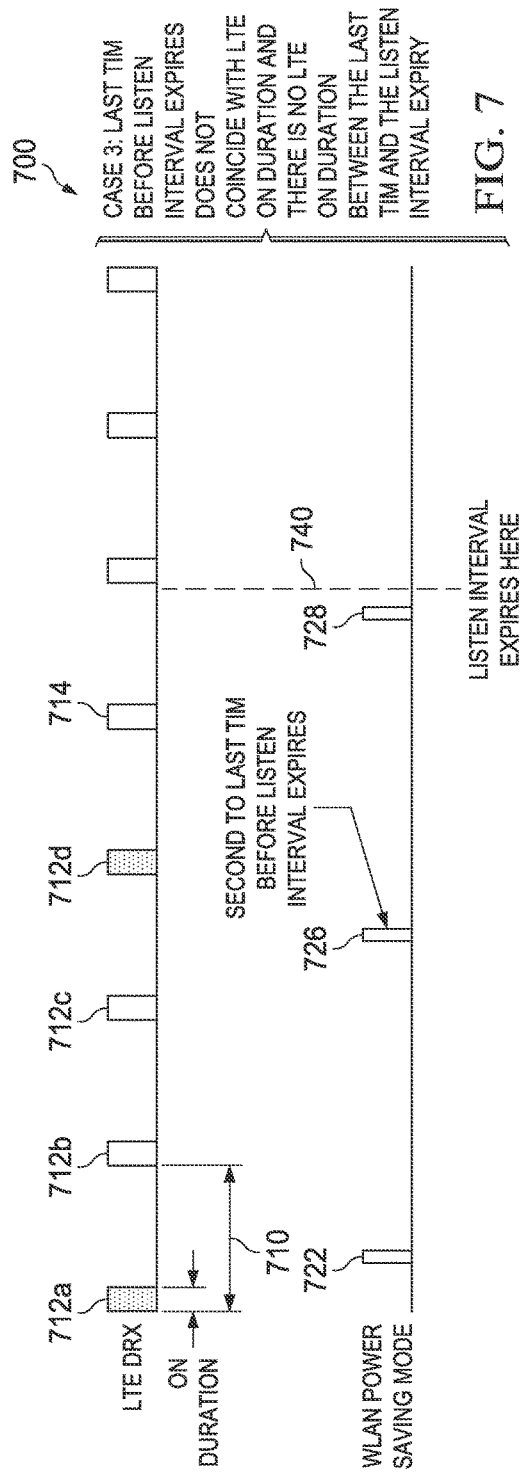
FIG. 5
FIG. 7

POWER SAVING FOR TIGHT COUPLED INTERWORKING

TECHNICAL FIELD

This disclosure relates to data transmission in communication systems and, more specifically, to providing a power saving feature for a Tight Coupled Interworking operation.

BACKGROUND

A wireless communication system, such as a third generation partnership project (3GPP) long term evolution (LTE) system, may use Discontinuous Reception (DRX) procedures to reduce battery power consumption of a User Equipment (UE) in the system. For example, a base station in the wireless communication system may configure a DRX cycle for a UE. In some cases, a DRX cycle may include a DRX On duration and a DRX Off duration. During the DRX On duration, the UE may receive and decode a Downlink (DL) transmission. In some cases, the monitored DL transmission may be a transmission on the Physical Downlink Control Channel (PDCCH). During the DRX Off duration, the UE may turn off its radio in order to save battery power. In some cases, the UE may extend the time that the UE monitors the DL transmission beyond the configured DRX On duration based on various events, such as new data arrival, Hybrid Automatic Repeat Request (HARM) procedure, and etc. In such a case, the time that the UE monitors the DL transmission is called the DRX active time.

A Wireless Local Area Network (WLAN) may use Legacy Power Save procedure to reduce battery power consumption of a non-AP station (STA) in a WLAN power saving mode. For example, a STA may enter a power saving mode by sending a Null frame to an Access Point (AP) with the Power Management bit set. From then on, instead of immediately transmitting all data addressed to the STA, the AP may store these data in a queue associated to this STA and send a TIM message to indicate that data are buffered for the STA. The AP may transmit the TIM message in a TIM transmission period. In some implementations, the AP may transmit the TIM message by setting the TIM field in a beacon frame. The AP may keep the frame in its buffer up for a predetermined number of beacon intervals. The predetermined number of beacon intervals is called a listen interval. A STA may set the listen interval at association time. The beacon interval is configurable. A typical value of the beacon interval is 102.4 ms. Each beacon interval includes a TIM period and a TIM transmission period. A TIM message may be transmitted during a TIM transmission period. Therefore, a STA may wake up at least once within each listen interval to decode a TIM and determine whether the AP has buffered data for the STA.

To retrieve the buffered data from the AP, the STA may send a Power Save Poll (PS_Poll) frame to the AP. In response, the AP may send a first queued data to the STA. The STA may receive the queued data. If the More Data field in this frame is set, which indicates that the AP has additional buffered data, the STA may send another PS_Poll frame to the AP. The STA may continue to send PS_Poll frames to receive all the queued frames. When all the buffered data are retrieved, the STA may go back to sleep until the next listen interval. In some implementations, the Legacy Power Save may be enhanced with a Wi-Fi Multimedia (WMM) power saving mode, which uses a slightly altered signaling procedure. For example, in a WMM power saving mode, the STA may immediately move to an active mode upon receiving the first buffered frame.

DESCRIPTION OF DRAWINGS

FIG. 5 is an example timing diagram illustrating a first scenario for a UE to select a TIM message to monitor.

FIG. 7 is an example timing diagram illustrating a third scenario for a UE to select a TIM message to monitor.

Like reference numbers and designations in the various drawings indicate like elements.

DETAILED DESCRIPTION

The present disclosure is directed to saving power in a Tight Coupled Interworking (TCIW) operation. In a TCIW operation, a Wireless Local Area Network (WLAN) carrier, e.g., a carrier that operates on 802.11 technology, may be integrated as a second carrier into a wireless network that operates on a Wide Area Network (WAN) technology, e.g., a Long Term Evolution (LTE) technology. In a TCIW operation, the bearer traffic may be split across an LTE air interface and a WLAN air interface. In some implementations, a Packet Data Convergence Protocol (PDCP) Protocol Data Unit (PDU) may be multiplexed across the LTE and the WLAN air interface. In a TCIW operation, a User Equipment (UE) may have an LTE circuit component that operates in normal LTE bands and a WLAN circuit component that operates in WLAN bands. The WLAN bands may include the 2.4 GHz band or the 5 GHz band.

Figure 1:
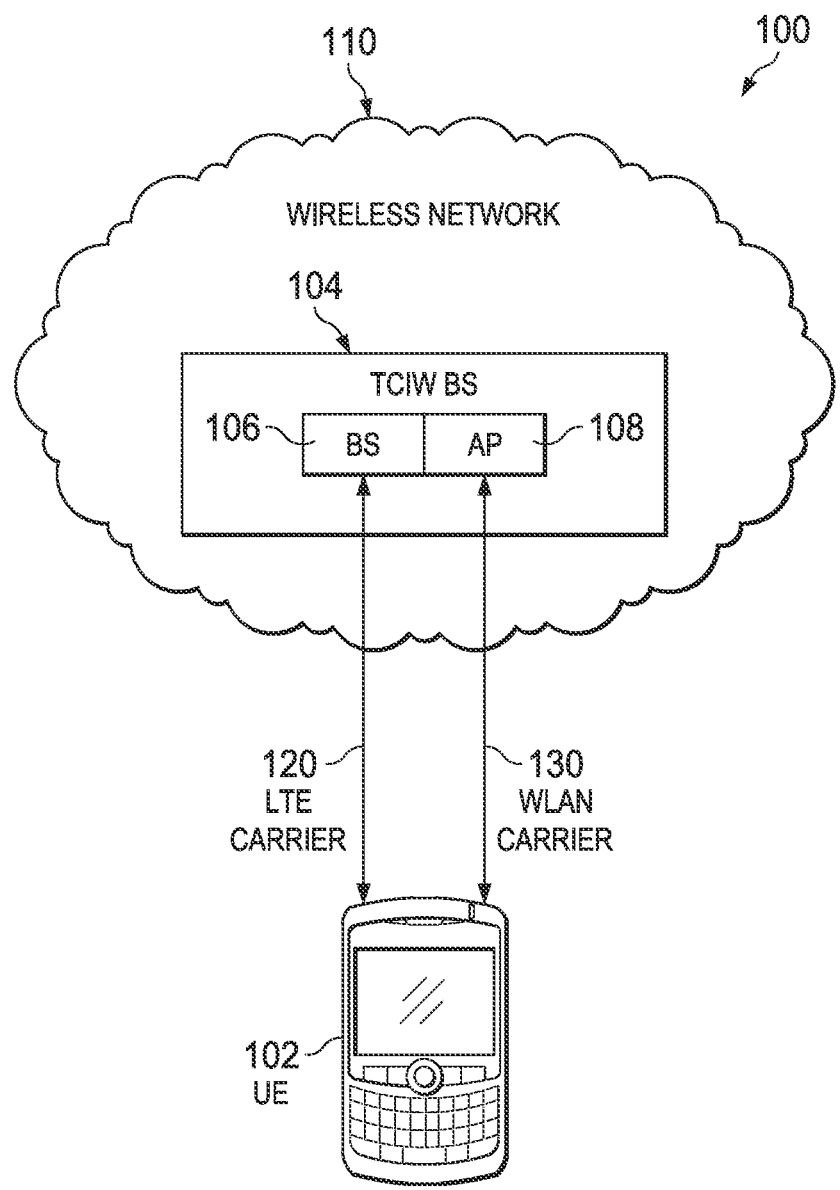
FIG. 1 is an example wireless communication system that provides a power saving feature in a Tight Coupled Interworking (TCIW) operation.

FIG. 1 is an example wireless communication system 100 that provides a power saving feature in a Tight Coupled Interworking (TCIW) operation. For example, in a wireless communication system, a UE may receive, from a base station, a Discontinuous Reception (DRX) configuration. The UE may determine a WLAN listen interval that includes at least one Traffic Indication Map (TIM) period and at least one TIM transmission period. The UE may select, based on the DRX configuration, a TIM message to monitor within an associated TIM transmission period from the at least one TIM transmission period in the listen interval. In some implementations, the selected TIM message may indicate whether the AP buffers downlink data for the UE. In some cases, the UE may determine a final TIM message. A final message may be the last TIM message transmitted within the listen interval. The UE may determine that a DRX On duration occurs between the final TIM message and an expiration of the listen interval, and therefore the UE may select the final TIM message as the TIM message to monitor. In some cases, the UE may determine that the final TIM message is transmitted between an expiration of the listen interval and an DRX On duration immediately preceding the expiration of the listen interval, and therefore the UE may select a second TIM message as the TIM message to monitor. The second TIM message is a TIM message that is transmitted immediately prior to the final TIM message.

The UE may determine a WLAN wakeup time that overlaps the associated TIM transmission period. During the associated TIM transmission periods, the UE may receive, from an Access Point (AP), the selected TIM message.

In some implementations, the UE may transmit a PS_Poll frame to the AP. The PS_Poll frame may include a request to retrieve a buffered downlink data for the UE. In some implementations, the PS_Poll frame is transmitted on a DRX On duration that is configured by the DRX configuration.

In some implementations, the UE may transmit an uplink (UL) data packet to the AP during a DRX active time. The DRX active time may include at least one subframe that the UE monitors for a Downlink transmission from the base station.

In some implementations, a UE may receive, from a base station, a DRX configuration. The UE may determine a WLAN power saving configuration based on the DRX configuration. The WLAN power saving configuration may include a listen interval. The UE may transmit, to an Access Point (AP), the WLAN power saving configuration.

In some implementations, a UE may transmit, to a base station, a DRX configuration request. The DRX configuration request may include a DRX assistance report that is based on a WLAN power saving configuration. The UE may receive, from the base station, a DRX configuration. The DRX configuration is determined based on the DRX assistance report. The UE may configure at least one DRX cycle based on the DRX configuration.

Providing a power saving feature according to methods and systems described herein may provide one or more advantages. For example, this approach may align instances when the UE is monitoring for LTE data and when the UE is monitoring for WLAN data. In a TCIW operation, the LTE circuit component and the WLAN circuit component in a UE may be tightly coupled. For example, they may share some Radio Frequency (RF) circuit components, some baseband circuit components, or combinations thereof. Aligning the monitoring and/or receiving instances for both carriers may enable the UE to turn off the shared circuit components when the UE does not monitor and or receive either the LTE carrier or the WLAN carrier, and thereby reduce power consumption at the UE. In addition, the methods and systems described herein may reduce signaling overhead and implementation complexity to achieve power saving gains. Moreover, the UE may choose the timing of sending the PS_Poll frames based on the relative timing of an LTE DRX ON duration or LTE active time, and thereby further reduce power consumption.

At a high level, the example wireless communication system 100 includes a UE 102 and a wireless communication network 110, which includes a TCIW base station 104 that is communicably coupled with the UE 102. In the illustrated example, the TCIW base station 104 may include two components. One component is a base station 106 that operates on a WAN technology, e.g., an LTE or an LTE-Advanced (LTE-A) technology. The other component is an Access Point (AP) 108 that operates on a WLAN technology, e.g., an 802.11 technology. In some implementations, the AP 108 and the base station 106 may be implemented as separate network nodes instead of part of the same TCIW base station. In the illustrated example, the UE 102 may transmit to or receive from the base station 106 on an LTE carrier 120. The UE 102 may also transmit to or receive from the AP 108 on a WLAN carrier 130. In the illustrated example, the WLAN carrier 130 operates in unlicensed spectrum.

In the illustrated example, the UE 102 receives a Discontinuous Reception (DRX) configuration from the base station 106 over the LTE carrier 120. The UE 102 determines a WLAN listen interval that includes at least one Traffic Indication Map (TIM) period and at least one TIM transmission period. The UE 102 selects, based on the DRX configuration, a TIM message to monitor within an associated TIM transmission period from the at least one TIM transmission period in the listen interval. The UE 102 determines a WLAN wakeup time that overlaps the associated TIM transmission period. The UE 102 receives the selected TIM message from the AP 108 over the WLAN carrier 130. FIGS. 2-8 and associated descriptions provide additional details of these implementations.

Figure 9:
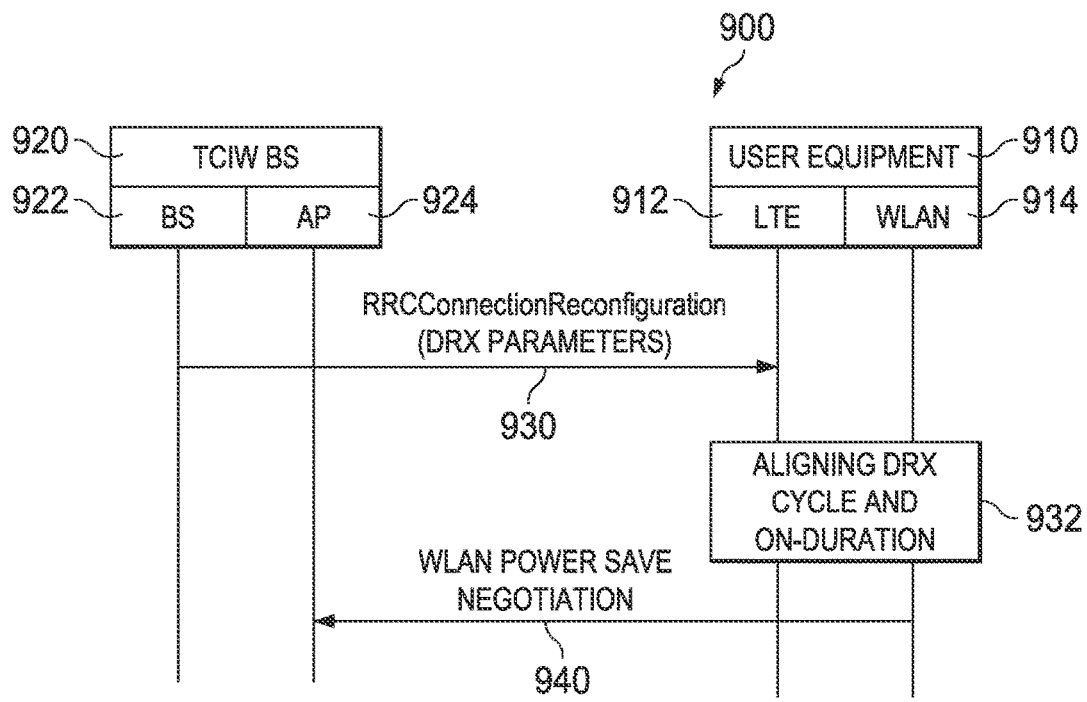
FIG. 9 is a data flow diagram illustrating an example method that aligns WLAN power saving configurations with DRX configurations.
Figure 10:
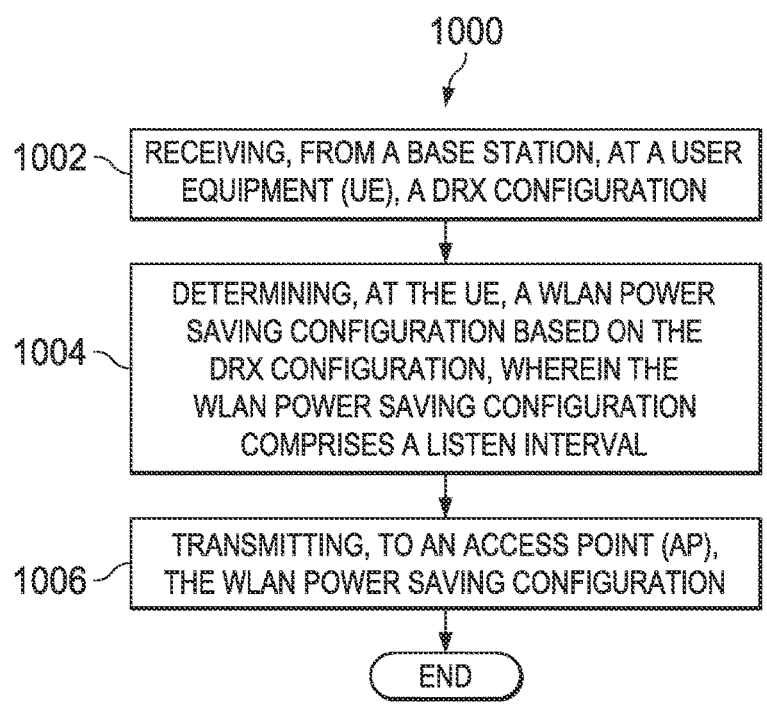
FIG. 10 is a flowchart illustrating an example method that aligns WLAN power saving configurations with DRX configurations.

In some instances, the UE 102 receives a DRX configuration from the base station 106 over the LTE carrier 120. The UE 102 determines a WLAN power saving configuration based on the DRX configuration. The WLAN power saving configuration includes a listen interval. The UE 102 transmits the WLAN power saving configuration, to the AP 108 over the WLAN carrier 130. FIGS. 9-10 and associated descriptions provide additional details of these implementations.

Figure 11:
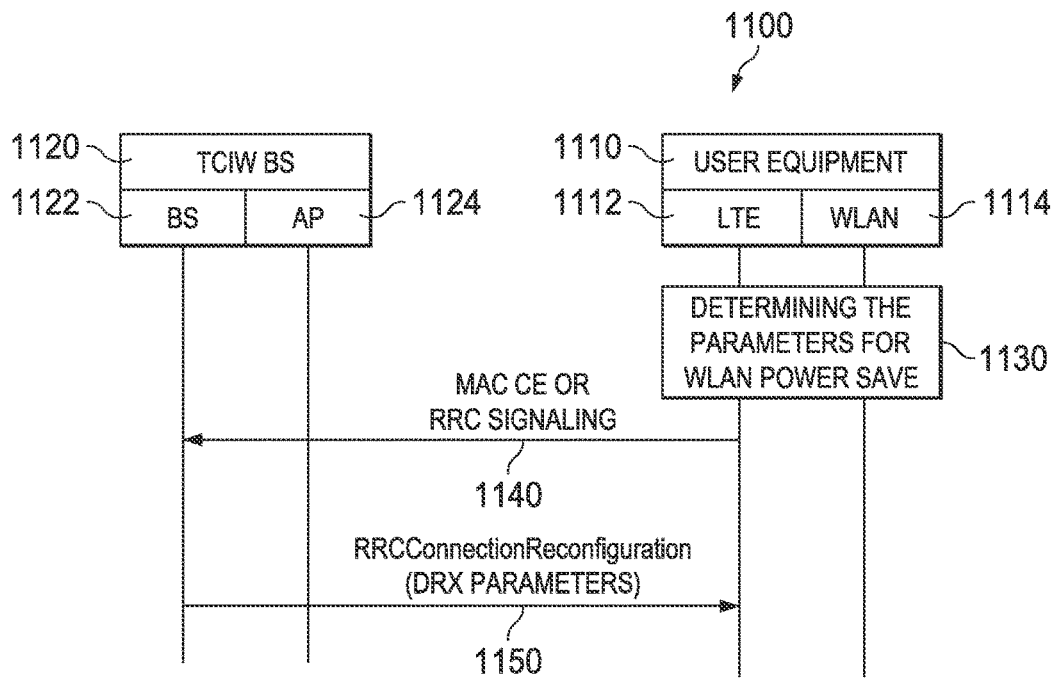
FIG. 11 is a data flow diagram illustrating an example method that aligns DRX configurations with WLAN power saving configurations.
Figure 12:
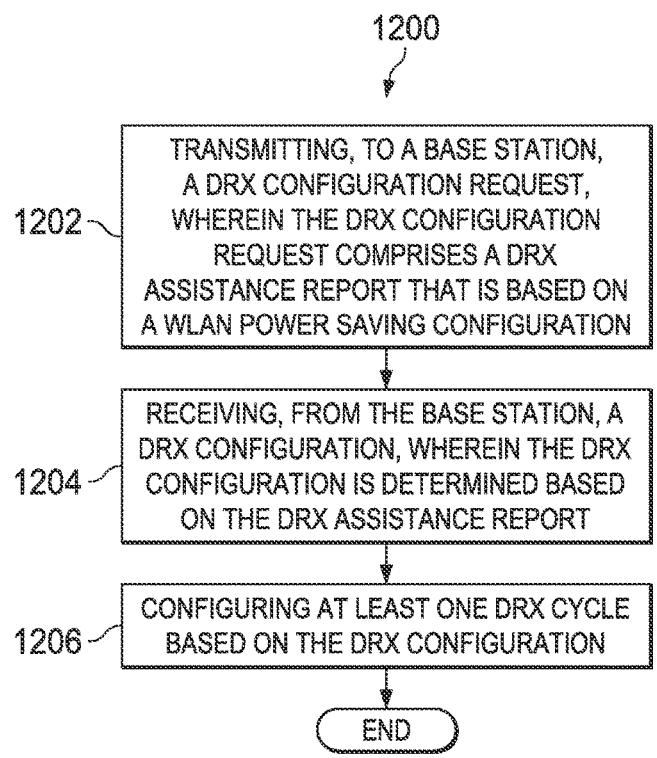
FIG. 12 is a flowchart illustrating an example method that aligns DRX configurations with WLAN power saving configurations.

In some instances, the UE 102 transmits a DRX configuration request to the base station 106 over the LTE carrier 120. The DRX configuration request includes a DRX assistance report that is based on a WLAN power saving configuration. The UE 102 receives a DRX configuration from the base station 106 over the LTE carrier 120. The DRX configuration is determined based on the DRX assistance report. The UE 102 configures at least one DRX cycle based on the DRX configuration. FIGS. 11-12 and associated descriptions provide additional details of these implementations.

Turning to a general description of the elements, a UE may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include wireless link over a licensed spectrum or over an unlicensed spectrum.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. A UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device,", "station", "STA", "non-AP STA", "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one TCIW base station 104. A TCIW base station 104 may be a radio base station that may control all or at least some radio-related functions in a fixed part of the system. The TCIW base station 104 may provide radio interface within their coverage area or a cell for the UE 102 to communicate. The TCIW base station 104 may be distributed throughout the cellular network to provide a wide area of coverage. The TCIW base station 104 directly communicates to one or a plurality of UEs, other base stations, and one or more core network nodes.

While described in terms of FIG. 1, the present disclosure is not limited to such an environment. As described previously, the TCIW base station 104 includes the base station 106 and the AP 108. The base station 106 and the AP 108 may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication system includes IEEE 802.11 wireless local area network, IEEE 802.16 WiMAX network, and others.

While portions of the software or hardware elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
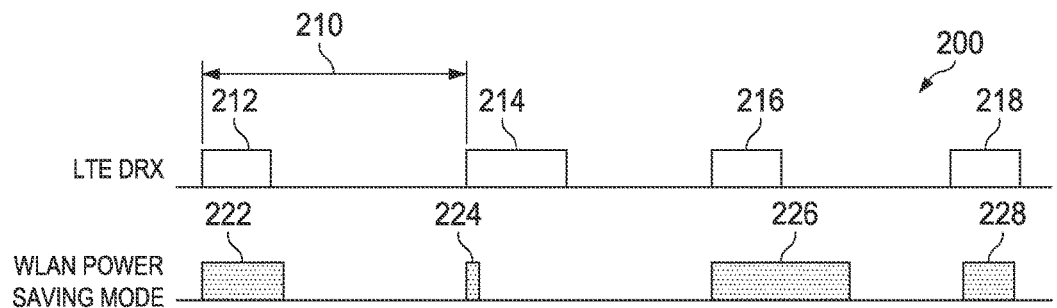
FIG. 2 is an example timing diagram illustrating a first alignment scenario of the LTE DRX cycle and the WLAN power saving mode.

FIG. 2 is an example timing diagram 200 illustrating a first alignment scenario of the LTE DRX cycle and the WLAN power saving mode. DRX coordination between the LTE component and WLAN component may be performed at different levels, e.g., on the long DRX cycle level, on the short DRX cycle level, or on the active time level. In some implementations, the DRX coordination may be performed on the long DRX cycle. This approach may provide one or more advantages. First, the DRX On duration in a long DRX cycle is the main contributor towards UE power consumption, and therefore aligning the long DRX cycle provides more power saving. Second, aligning the long DRX Cycle between the LTE DRX operation and the WLAN power saving mode provides a simple solution for power saving because the DRX On duration in the long DRX cycle is pre-configured through DRX configurations. Third, aligning the long DRX Cycle produces less signaling overhead.

The example timing diagram 200 includes DRX On durations 212, 214, 216, and 218, where the DRX On duration 212 is part of a DRX cycle 210. On duration 214 is extended a bit longer due to some events such as DL data reception or UL data transmission. The example timing diagram 200 further includes TIM transmission periods 222, 224, 226, and 228. In the illustrated example, the DRX cycle on the LTE carrier has the same duration as the beacon interval on the WLAN carrier. In such a case, the DRX cycle and the beacon interval may be aligned so that each TIM transmission period and DRX On duration overlaps each other. Therefore, a UE may wake up to monitor both the LTE carrier and the WLAN carrier at the same time and turn off part of RF or baseband circuit components when the UE finishes monitoring on both carriers.

Figure 3:
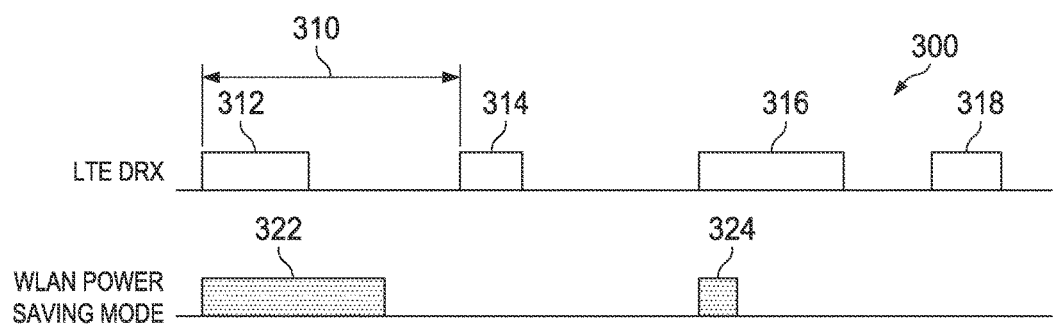
FIG. 3 is an example timing diagram illustrating a second alignment scenario of the LTE DRX cycle and the WLAN power saving mode.

FIG. 3 is an example timing diagram 300 illustrating a second alignment scenario of the LTE DRX cycle and the WLAN power saving mode. The example timing diagram 300 includes DRX On durations 312, 314, 316, and 318, where the DRX On duration 312 is part of a DRX cycle 310. On duration 312 and 316 is extended a bit longer due to some events such as DL data reception or UL data transmission. The example timing diagram 300 further includes TIM transmission periods 322 and 224. In the illustrated example, the beacon interval on the WLAN carrier is multiple of the DRX cycle on the LTE carrier. In such a case, the DRX cycle and the beacon interval may be aligned so that each TIM transmission period overlaps with a DRX On duration. Therefore, a UE may monitor the WLAN carrier when the UE wakes-up (i.e. receiver is turned on) to monitor the LTE carrier.

Figure 4:
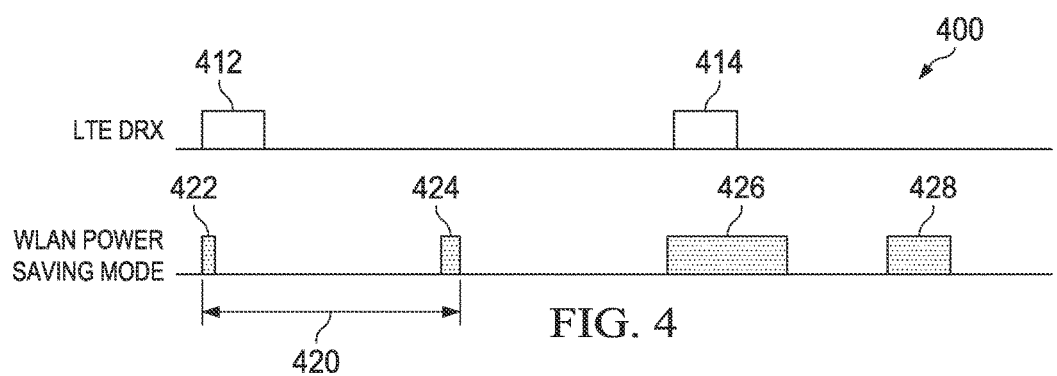
FIG. 4 is an example timing diagram illustrating a third alignment scenario of the LTE DRX cycle and the WLAN power saving mode.

FIG. 4 is an example timing diagram 400 illustrating a third alignment scenario of the LTE DRX cycle and the WLAN power saving mode. The example timing diagram 400 includes DRX On durations 412 and 414. The example timing diagram 400 further includes TIM transmission periods 422, 424, 426, and 428, where the TIM transmission period 422 is part of the beacon interval 420. In the illustrated example, the DRX cycle on the LTE carrier is multiple of the beacon interval on the WLAN carrier. In such a case, the DRX cycle and the beacon interval may be aligned so that each DRX On duration overlaps with a TIM transmission period. Therefore, a UE may wake up to monitor the LTE carrier while the UE also monitors the WLAN carrier.

FIG. 5 is an example timing diagram 500 illustrating a first scenario for a UE to select a TIM message to monitor. The example timing diagram 500 includes DRX On durations 512a-f and 514. The DRX On duration 512a is part of a DRX cycle 510. The example timing diagram 500 further includes TIM transmission periods 522, 526, 528, and a TIM period 524 between the end of the TIM transmission period 522 and the beginning of the TIM transmission period 526. The listen interval on the WLAN carrier expires at 540, and therefore a TIM message transmitted on the TIM transmission period 528 is the last TIM message transmitted within the listen interval.

In some implementations, the DRX cycle on the LTE carrier may be configured by the base station. In some implementations, e.g., in a WLAN power saving mode, a UE may determine which TIM message on the WLAN carrier to monitor. The UE may wake up during the TIM transmission period that is associated with the selected TIM message and monitor the selected TIM message. In some implementations, the UE may follow the DRX configuration on the LTE carrier and select the TIM message on the WLAN carrier to monitor based on the DRX configuration. In some implementations, the UE may be signaled by the network to monitor a specific TIM transmission. In the illustrated example, the UE is configured with both LTE DRX cycles and WLAN power saving parameters. On the LTE side, the base station may transmit a DRX configuration, which may include one or more of the DRX parameters. These DRX parameters may include onDurationTimer, drx-InactivityTimer, drx-RetransmissionTimer, longDRX-Cycle, drx-ShortCycleTimer, shortDRX-Cycle, etc. The UE may configure a DRX cycle base on the DRX configuration. On the WLAN side, the UE provides a listen interval to the AP.

In the illustrated example, the last TIM message is transmitted on the TIM transmission period 528, which coincides with the DRX ON duration 514. In other words, the TIM transmission period 528 falls within the DRX ON duration 514. Therefore, a UE may select the last TIM message to monitor. This approach enables the UE to wake up at the same time for both the LTE carrier and the WLAN carrier. If there is buffered DL data for the UE on the WLAN carrier, the UE may send a PS_Poll frame to the AP and initiate the data communication with the AP during the DRX ON duration 514. The UE may keep its WLAN circuit components active until the data communication is completed with the WLAN AP. In some cases, the UE may keep the WLAN circuit components inactive if there is no buffered DL data on the AP for the UE. In such a case, the UE may be awoken during the active time and go back to sleep when the active time expires. As described previously, in some cases, the DRX active time may be extended based on the data communication activity on the LTE carrier.

In some implementations, the UE may buffer its UL data for the WLAN carrier. The UE may transmit the buffered UL data to the AP during the DRX active time. In some cases, the UE may keep awake for some additional time beyond the DRX active time for the WLAN communication activities. In some implementations, if the QoS requirement of the uplink data is tight, for example, the delay requirement, the UE may transmit the data regardless of the DRX requirements.

Figure 6:
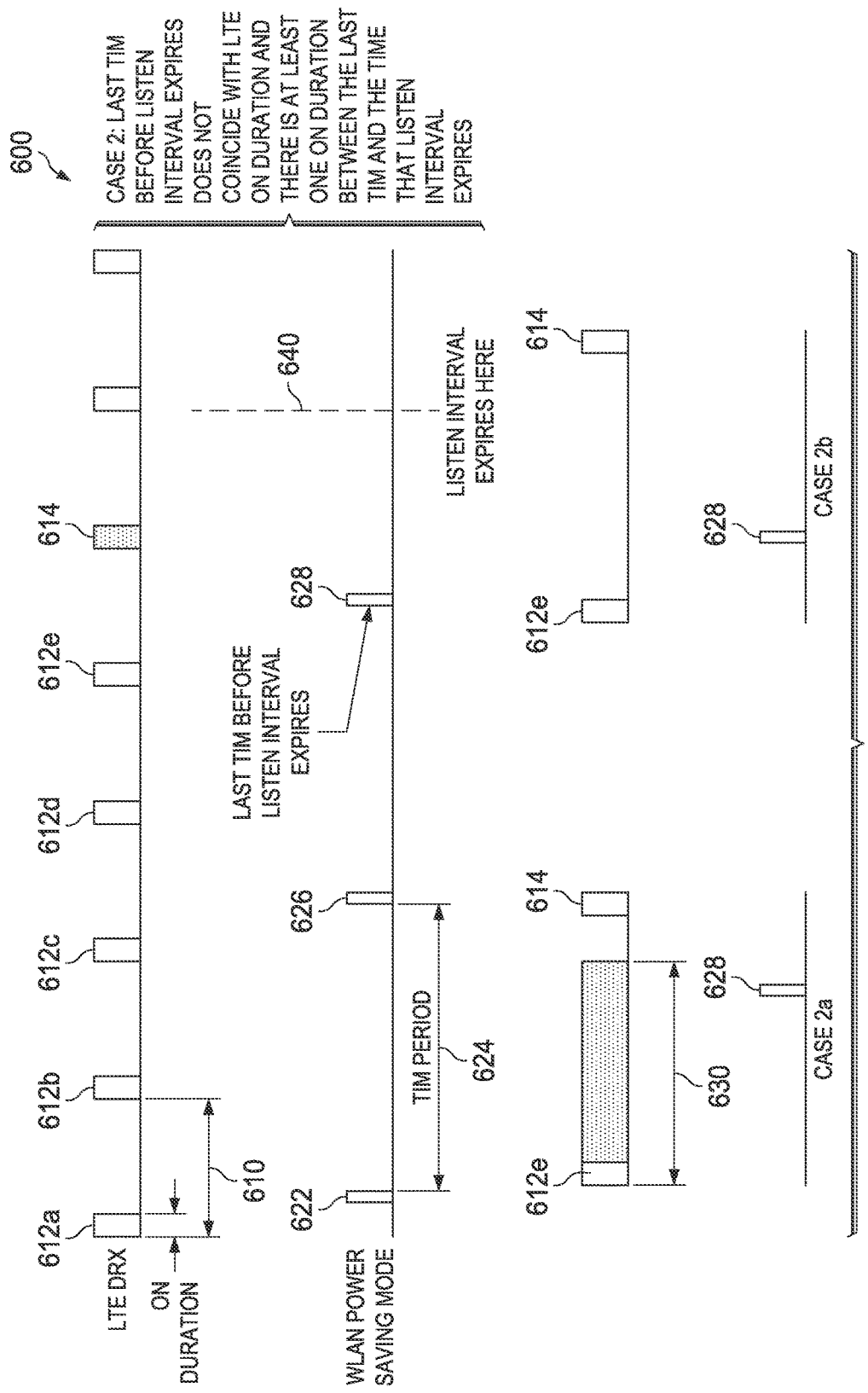
FIG. 6 is an example timing diagram illustrating a second scenario for a UE to select a TIM message to monitor.

FIG. 6 is an example timing diagram 600 illustrating a second scenario for a UE to select a TIM message to monitor. The example timing diagram 600 includes DRX On durations 612a-e and 614. The DRX On duration 612a is part of a DRX cycle 610. The example timing diagram 600 further includes TIM transmission periods 622, 626, 628, and a TIM period 624 between the end of the TIM transmission period 622 and the beginning of the TIM transmission period 626. The listen interval on the WLAN carrier expires at 640, and therefore a TIM message transmitted on the TIM transmission period 628 is the last TIM message transmitted within the listen interval. Furthermore, the example timing diagram 600 also includes a DRX active time 630.

In the illustrated example, the last TIM message is transmitted on the TIM transmission period 628, which does not coincide with any DRX ON durations. In the illustrated example, at least one DRX On duration, e.g., the DRX On duration 614, occurs between the TIM transmission period 628 and the expiration of the listen interval 640. Therefore, a UE may select the last TIM message to monitor.

Two cases may occur in this scenario. In the first case, i.e., case 2a in the illustrated example, the UE receives DL or UL scheduled data on the LTE carrier, and thereby extending the DRX active time 630 on the LTE carrier. The DRX active time 630 includes the TIM transmission period 628. In such a case, the UE may monitor the last TIM message during the DRX active time to check whether there is buffered DL data for this UE on the WLAN carrier. If there is data for the UE, the UE sends a PS_Poll frame to the AP and initiates the data communication with the AP during the DRX active time. The UE may keep its WLAN circuit components active until the data communication is completed with the WLAN AP. In some cases, the UE may keep the WLAN circuit components inactive if there is no buffered DL data on the AP for the UE. In such a case, the UE may be awoken during the LTE active time and go back to sleep when the active time expires. As described previously, in some cases, the DRX active time may be extended based on the data communication activity on the LTE carrier.

In some implementations, the UE may buffer its UL data for the WLAN carrier. The UE may transmit the buffered UL data to the AP during the DRX active time. In some cases, the UE may keep awake for some additional time beyond the DRX active time for the WLAN communication activities. In some implementations, if the QoS requirement of the uplink data is tight, for example, the delay requirement, the UE may transmit the data regardless of the DRX requirements.

In the second case, i.e., case 2b in the illustrated example, the UE is not in a DRX active time when the last TIM message is transmitted. In other words, the TIM transmission period 628 does not overlap with any DRX active time. The UE may activate its WLAN circuit components and monitor the last TIM message during the TIM transmission period 628. The UE may wait until the next DRX ON duration, e.g., the DRX On duration 614, to send a PS_Poll frame to the AP and initiate the data communication with the AP. This approach may save the UE's battery power by aligning the active time for the WLAN and LTE carrier. Furthermore, because there is a DRX On duration before the expiration of the listen interval, the UE may mitigate the buffer overflow risk for the WLAN carrier. Alternatively, the UE may choose to send PS_Poll earlier if there is an urgency to receive the buffered data from the AP. The user may make the choice through UI interface.

FIG. 7 is an example timing diagram 700 illustrating a third scenario for a UE to select a TIM message to monitor. The example timing diagram 700 includes DRX On durations 712a-d and 714. The DRX On duration 712a is part of a DRX cycle 710. The example timing diagram 700 further includes TIM transmission periods 722, 726, 728. The listen interval on the WLAN carrier expires at 740, and therefore a TIM message transmitted on the TIM transmission period 728 is the last TIM message transmitted within the listen interval.

In the illustrated example, the last TIM message is transmitted on the TIM transmission period 728, which does not coincide with any DRX ON durations. Furthermore, there is no DRX ON duration between the TIM transmission period 728 and the expiration of the listen interval 740. In such a case, the UE may select the second to last TIM message to monitor. The second to last TIM message is the TIM message that is transmitted immediately prior to the last TIM message. In the illustrated example, the second to last TIM message is the TIM message that is transmitted on the TIM transmission period 726. If there is DL data for the UE, the UE may wait until the next DRX ON duration, e.g., the DRX On duration 712*d* or 714, to send a PS_Poll frame to the AP and initiate the data communication with the AP. This approach may save the UE's battery power by aligning the active time for the WLAN and LTE carrier. Furthermore, because there is a DRX On duration before the expiration of the listen interval, the UE may mitigate the buffer overflow risk for the WLAN carrier. Alternatively, the UE may choose to send PS_Poll earlier if there is an urgency to receive the buffered data from the AP. The user may make the choice through UI interface.

In some implementations, during any DRX active time, the UE may activate its WLAN circuit components to check whether there is buffered UL data to be sent to the AP. If there is buffered UL data, the UE may initiate data communication with the AP.

Figure 8:
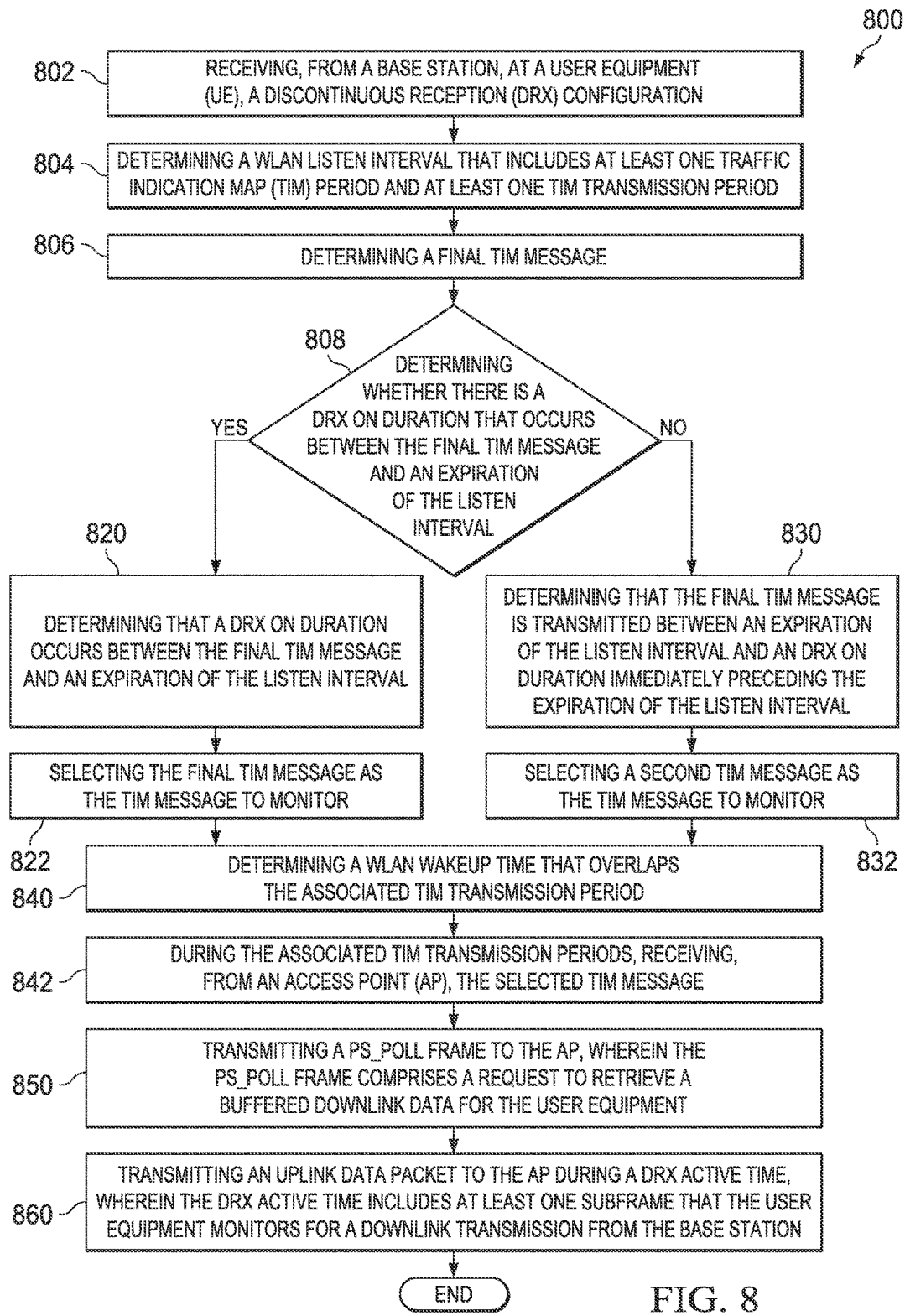
FIG. 8 is a flowchart illustrating an example method for power saving in a TCIW operation.

FIG. 8 is a flowchart illustrating an example method 800 for power saving in a TCIW operation. The method 800 begins at 802, where a UE receives, from a base station, a Discontinuous Reception (DRX) configuration. At 804, the UE determines a WLAN listen interval that includes at least one Traffic Indication Map (TIM) period and at least one TIM transmission period.

From 806 to 832, the UE selects, based on the DRX configuration, a TIM message to monitor within an associated TIM transmission period from the at least one TIM transmission period in the listen interval. In some implementations, the selected TIM message may indicate whether the AP buffers Downlink data for the UE. Following paragraphs provide a detailed description of these steps.

At 806, the UE determines a final TIM message. The final message is the last TIM message transmitted within the listen interval.

At 808, the UE determines whether there is a DRX On duration that occurs between the final TIM message and an expiration of the listen interval. At 820, the UE determines that there is a DRX On duration occurs between the final TIM message and an expiration of the listen interval. In some cases, a DRX On duration starts after the final TIM message has been transmitted. Alternatively or in combination, the DRX On duration starts before the final TIM message has been transmitted and ends after the final TIM message is transmitted. At 822, the UE select the final TIM message as the TIM message to monitor.

At 830, the UE determine that the final TIM message is transmitted between an expiration of the listen interval and a DRX On duration immediately preceding the expiration of the listen interval. At 832, the UE selects a second last TIM message as the TIM message to monitor. The second TIM message is a TIM message that is transmitted immediately prior to the final TIM message.

At 840, the UE determines a WLAN wakeup time that overlaps the associated TIM transmission period. At 842, during the associated TIM transmission periods, the UE receives, from an Access Point (AP), the selected TIM message.

At 850, the UE transmits a PS_Poll frame to the AP. The PS_Poll frame may include a request to retrieve a buffered downlink data for the UE. In some implementations, the PS_Poll frame is delayed in order to be transmitted on a DRX On duration that is configured by the DRX configuration. In some implementations, the PS_Poll frame is delayed in order to be transmitted on a DRX active time. In some implementations, the PS_Poll frame is transmitted immediately after the TIM message monitoring. At 860, the UE transmits an uplink (UL) data packet to the AP during a DRX active time or DRX on duration. The DRX active time may include at least one subframe that the UE monitors for a Downlink transmission from the base station.

In an LTE air interface, a base station may determine the DRX configuration. The DRX configuration may include various timers, such as on-duration timer, inactivity timer, long DRX cycle timer, short DRX cycle timer, retransmission timer, etc. A base station may transmit the DRX configuration to the UE and the UE may configure the DRX operation based on the DRX configuration and various events. Further, the base station may determine the updates of the parameters, for example, when there is a change in traffic situations, and may send an update to the UE accordingly. In a WLAN air interface, the UE may control the operation of the power saving mode. For example, the UE may determine the parameters such as listen intervals, and negotiate these values with the AP for power saving configurations. The UE may also determine the updates of the power saving parameters and transmit to the AP. As described below, three alignment approaches may be used. These approaches apply to both the WLAN power saving mode and the WiFi Multimedia (WMM) power saving mode.

FIG. 9 is a data flow diagram 900 illustrating an example method that aligns WLAN power saving configurations with DRX configurations. The data flow diagram 900 includes a TCIW base station 920 that includes a base station 922 and an AP 924. In some implementations, the AP 924 and the base station 922 may be implemented as separate network nodes. The data flow diagram 900 also includes a UE 910 that includes an LTE component 912 and a WLAN component 914.

In the illustrated example, the base station 922 determines a DRX configuration for the LTE operation. At 930, the base station 922 transmits the DRX configuration to the LTE component 912 of the UE 910 via dedicated signaling. The DRX configuration may include DRX parameters such as the long DRX cycle timer or on-duration timer. In some implementations, the DRX configuration is transmitted using Radio Resource Control (RRC) signaling. At 932, the UE 910 determines the WLAN power saving configuration based on the received DRX configurations. For example, the UE 910 may set the parameters in the WLAN power saving configuration so that the DRX cycle may be the same or the multiple of each other. The UE may also set parameters in the WLAN power saving configuration so that the DRX On duration and the TIM transmission period overlap with each other. At 940, the UE 910 initiates the negotiation with the AP 924 of the TCIW base station 920 by transmitting the WLAN power saving configuration. In some implementations, when the DRX parameters, e.g., the long DRX cycle timer or on-duration timer, change on the LTE carrier, the base station 922 may signal the updates to the UE 910 and the UE 910 may update the WLAN power saving mode accordingly. The following represents an example portion of 3GPP TS 36.331 specification that may support the illustrated approach.

5.3.10.4 MAC Main Reconfiguration
The UE shall:
1> reconfigure the MAC main configuration in accordance with the received mac-MainConfig;
1> if mac-MainConfig includes drx-Config
2> set ListenInterval to the multiple of longDRX-cycle;

FIG. 10 is a flowchart illustrating an example method 1000 that aligns WLAN power saving configurations with DRX configurations. The method 1000 begins at 1002, where a UE receives, from a base station, a DRX configuration. At 1004, the UE determines a WLAN power saving configuration based on the DRX configuration. The WLAN power saving configuration may include a listen interval. At 1006, the UE transmits, to an Access Point (AP), the WLAN power saving configuration.

FIG. 11 is a data flow diagram 1100 illustrating an example method that aligns DRX configurations with WLAN power saving configurations. The data flow diagram 1100 includes a TCIW base station 1120 that includes a base station 1122 and an AP 1124. In some implementations, the AP 1124 and the base station 1122 may be implemented as separate network nodes. The data flow diagram 1100 also includes a UE 1110 that includes an LTE component 1112 and a WLAN component 1114.

In the illustrated example, at 1130, the UE 1110 determines a WLAN power saving configuration. The UE 1110 may negotiate the WLAN power saving mode with the AP 1124 based on the WLAN power saving configuration. At 1140, the UE 1110 transmits a DRX assistance report to the base station 1122. The DRX assistance report is based on the WLAN power saving configuration. For example, the DRX assistance report may include the beacon interval and the listen interval. In some other example, the DRX assistance report may include the suggested long DRX cycle, the on-duration, and the DRX start offset, etc. In some implementations, the DRX assistance report is transmitted in a Medium Access Control (MAC) Channel Element (CE). Alternatively or in combination, the DRX assistance report is transmitted using RRC signaling. In some implementations, the UE 1110 may transmit the DRX assistance report when some parameters of the WLAN power saving configuration have changed. For example, the UE 1110 may transmit the DRX assistance report when the listen interval is changed. In some implementations, the base station 1122 may configure the transmission of the DRX assistance report. For example, the base station 1122 may limit the transmission of the DRX assistance report to reduce signaling overheads.

At 1150, the base station 1122 determines a DRX configuration based on the DRX assistance report and sends the DRX configuration to the UE 1110. In some implementations, the DRX configuration is transmitted in an RRC message, e.g., an RRCConnectionReconfiguration message. The following represents an example portion of 3GPP TS 36.331 specification that may support the illustrated approach.

TABLE 6.2.1-2

| Values of LCID for UL-SCH | |
|---|---|
| Index | LCID values |
| 00000 | CCCH |
| 00001-01010 | Identity of the logical channel |
| 01011-10999 | Reserved |

TABLE 6.2.1-2-continued

| Values of LCID for UL-SCH | |
|---|---|
| Index | LCID values |
| 11000 | DRX Assistance Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

6.1.6 DRX Assistance Report
The DRX Assistance report MAC control element is identified by a MAC PDU subheader with LCID as specified in table 6.2.1-2. It has a fixed size and consists of three octets containing Beacon Interval field and Listen Interval field. The DRX assistance report MAC control element is defined as follows:
Beacon Interval (2 octets): the field indicates the Beacon Interval of the Wi-Fi power saving mode
ListenInterval (1 octets): the field indicates the ListenInterval of the Wi-Fi power saving mode on the Wi-Fi component.

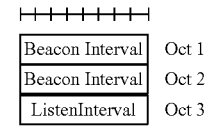

| Beacon Interval | Oct 1 |
| Beacon Interval | Oct 2 |
| ListenInterval | Oct 3 |

FIG. 12 is a flowchart illustrating an example method 1200 that aligns DRX configurations with WLAN power saving configurations. The method 1200 begins at 1202, where a UE transmits, to a base station, a DRX configuration request. The DRX configuration request may include a DRX assistance report that is based on a WLAN power saving configuration. At 1204, the UE receives, from the base station, a DRX configuration. The DRX configuration is determined based on the DRX assistance report. At 1206, the UE configures at least one DRX cycle based on the DRX configuration.

In some implementations, the WLAN AP (or elements of a WLAN AP) is deployed in close association with the base station in a TCIW network configuration. For example, the AP and the base station may be co-located in the same physical bay enclosure, e.g., in a TCIW base station. Alternatively or in combination, the AP and the base station may be connected by a tight logical connection such as a combined scheduler. In such a case, the base station's DRX scheduler may be aware of the UEs that are simultaneously connected to both base station and the AP. The base station's DRX scheduler may also be aware of the WLAN power saving configuration of the UE. Using this knowledge, the base station can align the DRX configuration with the WLAN power saving configuration, e.g., matching the DRX On durations with the TIM transmission period. Alternatively or in combination, the AP may align the WLAN power saving configuration with the DRX configuration so that the TIM transmission period may overlap with the DRX ON durations. This approach may increase the opportunity for the UE to have the same wakeup period on both radios. This approach may also reduce signaling exchanges to effect such alignment because the AP and the base station can coordinate by using a standard or proprietary internal mechanism. Such a mechanism may include signaling on the Xn interface.

In a further deployment scenario of TCIW network, there may be multiple WLAN APs within the coverage area of a single base station. If all the APs and the base stations are controlled by one entity, the beacon times of the various APs can be spread out in time. The DRX cycles of each UE would may coincide with its nearest AP. Thus, as the beacons are spread evenly within the cell, the UE's DRX cycles will also be spread out. This approach has one or more advantages. First, spreading out the DRX On duration evenly may avoid having the traffic clustered in certain periods of time. Second, the AP may reduce scheduling beacons to avoid beacon collision because the APs are close together.

Figure 13:
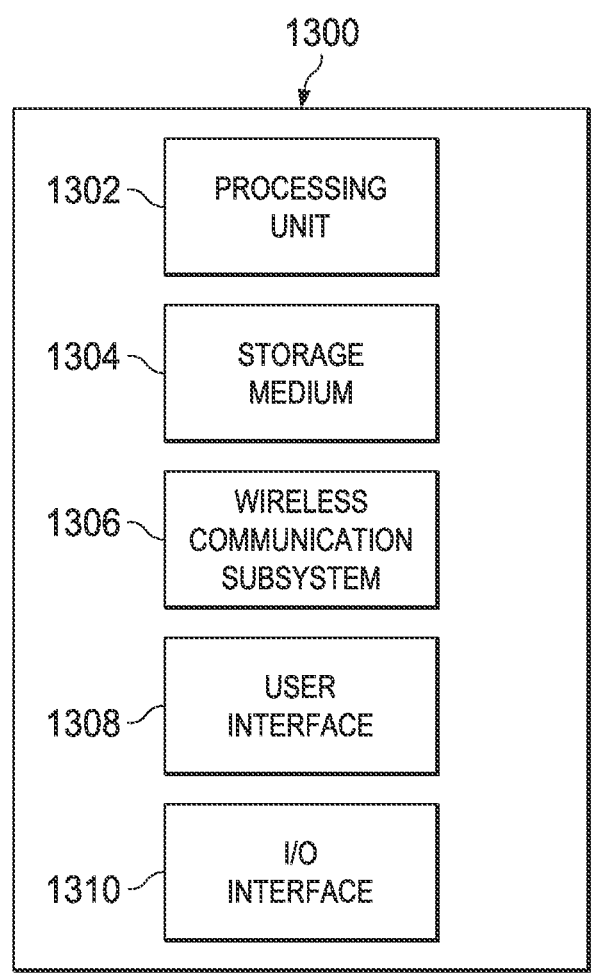
FIG. 13 is a schematic block diagram illustrating an example user equipment (UE) device.

FIG. 13 is a schematic block diagram illustrating an example user equipment device 1300. The illustrated device 1300 includes a processing unit 1302, a computer-readable storage medium 1304 (for example, ROM or flash memory), a wireless communication subsystem 1306, a user interface 1308, and an I/O interface 1310.

The processing unit 1302 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 1302 may be configured to generate control information, such as a measurement report, or respond to received information, such as control information from a network node. The processing unit 1302 may also be configured to make an RRM decision such as cell selection/reselection information or trigger a measurement report. The processing unit 1302 can also include other auxiliary components, such as random access memory (RAM) and read only memory (ROM). The computer-readable storage medium 1304 can store an operating system (OS) of the device 1300 and various other computer-executable software programs for performing one or more of the processes, steps, or actions described above.

The wireless communication subsystem 1306 may be configured to provide wireless communication for data and/or control information provided by the processing unit 1302. The wireless communication subsystem 1306 can include, for example, one or more antennas, a receiver, a transmitter, a local oscillator, a mixer, and a digital signal processing (DSP) unit. In some implementations, the subsystem 1306 can support multiple input multiple output (MIMO) transmissions. In some implementations, the receivers in the wireless communication subsystems 1306 can be an advance receiver or a baseline receiver. Two receivers can be implemented with identical, similar, or different receiver processing algorithms.

The user interface 1308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1310 can include, for example, a universal serial bus (USB) interface. Various other components can also be included in the device 1300. A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method for determining a Wireless Local Area Network (WLAN) wakeup time, comprising:
   receiving, from a base station, at a user equipment (UE), a Discontinuous Reception (DRX) configuration;
   determining a WLAN listen interval that includes one or more Traffic Indication Map (TIM) transmission periods, wherein each of the one or more TIM transmission periods includes a TIM message;
   determining a last TIM message in the WLAN listen interval, wherein no TIM message exists between the last TIM message and an expiration of the WLAN listen interval;
   determining that the last TIM transmission period associated with the last TIM message overlaps on a DRX On duration of the DRX configuration; and
   in response to determining the last TIM message in the WLAN listen interval and that the last TIM transmission period overlaps on the DRX On duration of the DRX configuration:
     selecting the last TIM message to monitor;
     turning off a WLAN circuit component of the UE for TIM transmission periods in the WLAN listen interval other than the last TIM transmission period;
     activating the WLAN circuit component of the UE for the last TIM transmission period and activating a long term evolution (LTE) circuit component of the UE for the DRX On duration of the DRX configuration;
     during the last TIM transmission period, receiving, from an Access Point (AP), the last TIM message.

2. The method of claim 1, further comprising:
receiving a second DRX configuration;
determining a final TIM message, wherein the final TIM message is the last TIM message transmitted within the WLAN listen interval;
determining that a DRX On duration of the second DRX configuration occurs between the final TIM message and an expiration of the WLAN listen interval; and
selecting the final TIM message as a TIM message to monitor.

3. The method of claim 1, further comprising:
receiving a third DRX configuration;
determining a final TIM message, wherein the final TIM message is the last TIM message transmitted within the WLAN listen interval;
determining that the final TIM message is transmitted between an expiration of the WLAN listen interval and a DRX On duration of the third DRX configuration immediately preceding the expiration of the WLAN listen interval; and
selecting a third TIM message as a TIM message to monitor, wherein the third TIM message is a TIM message that is transmitted immediately prior to the final TIM message.

4. The method of claim 1, further comprising:
transmitting a PS_Poll frame to the AP, wherein the PS_Poll frame comprises a request to retrieve a buffered Downlink (DL) data for the UE.

5. The method of claim 4, wherein the PS_Poll frame is transmitted on a DRX On duration that is configured by the DRX configuration.

6. The method of claim 1, further comprising:
transmitting an uplink data packet to the AP during a DRX active time, wherein the DRX active time includes at least one subframe that the UE monitors for a Downlink transmission from the base station.

7. The method of claim 1, wherein the last TIM message indicates whether the AP buffers downlink data for the UE.

8. A method, comprising: receiving, from a base station, at a user equipment (UE), a DRX configuration;
in response to receiving the DRX configuration from the base station,
determining, at the UE,
a WLAN power saving configuration based on the DRX configuration,
wherein the WLAN power saving configuration comprises a listen interval,
the listen interval includes one or more Traffic Indication Map (TIM) transmission periods,
each of the one or more TIM transmission periods includes a TIM message;
determining a last TIM message in the WLAN listen interval, wherein no TIM message exists between the last TIM message and an expiration of the WLAN listen interval,
determining the last TIM transmission period associated with the last TIM message overlaps a DRX On duration of the DRX configuration, and in response
the UE turns off a WLAN circuit component of the UE for TIM transmission period periods in the WLAN listen interval other than the last TIM transmission period, and activates the WLAN circuit component of the UE for the last TIM transmission period; and
transmitting, to an Access Point (AP), the WLAN power saving configuration.

9. A method, comprising:
transmitting, to a base station and by a user equipment (UE), a DRX configuration request, wherein the DRX configuration request comprises a DRX assistance report that is based on a WLAN power saving configuration, wherein the WLAN power saving configuration comprises a listen interval, the listen interval includes one or more Traffic Indication Map (TIM) transmission periods, each of the one or more TIM transmission periods includes a TIM message, and a last TIM message in the listen interval is determined such that no TIM message exists between the last TIM message and an expiration of the WLAN listen interval;
receiving, from the base station, a DRX configuration, wherein the DRX configuration is determined based on the DRX assistance report and includes a DRX On duration that overlaps the last TIM transmission period associated with the last TIM message, wherein the UE turns off a WLAN circuit component of the UE for TIM transmission periods in the WLAN listen interval other than the last TIM transmission period, and activates the WLAN circuit component of the UE for the last TIM transmission period; and
configuring, by the UE, at least one DRX cycle based on the DRX configuration.

10. A user equipment (UE), comprising:
one or more processors configured to:
receive, from a base station, a Discontinuous Reception (DRX) configuration;
determine a WLAN listen interval that includes one or more Traffic Indication Map (TIM) transmission periods, wherein each of the one or more TIM transmission periods includes a TIM message;
determine a last TIM message in the WLAN listen interval, wherein no TIM message exists between the last TIM message and an expiration of the WLAN listen interval;
determine that the last TIM transmission period associated with the last TIM message overlaps on a DRX On duration of the DRX configuration; and
in response to determining the last TIM message in the WLAN listen interval and that the last TIM transmission period overlaps on the DRX On duration of the DRX configuration:
select the last TIM message to monitor;
turn off a WLAN circuit component of the UE for TIM transmission periods in the WLAN listen interval other than the last TIM transmission period;
activate the WLAN circuit component of the UE for the last TIM transmission period and activating a long term evolution (LTE) circuit component of the UE for the DRX On duration of the DRX configuration;
during the last TIM transmission period, receive, from an Access Point (AP), the last TIM message.

11. The UE of claim 10, wherein the one or more processors are further configured to:
receive a second DRX configuration;
determine a final TIM message, wherein the final TIM message is the last TIM message transmitted within the WLAN listen interval;
determine that a DRX On duration of the second DRX configuration occurs between the final TIM message and an expiration of the WLAN listen interval; and
select the final TIM message as a TIM message to monitor.

12. The UE of claim 10, wherein the one or more processors are further configured to:
receive a third DRX configuration;
determine a final TIM message, wherein the final TIM message is the last TIM message transmitted within the WLAN listen interval;
determine that the final TIM message is transmitted between an expiration of the WLAN listen interval and a DRX On duration of the third DRX configuration immediately preceding the expiration of the WLAN listen interval; and
select a second TIM message as a TIM message to monitor, wherein the second TIM message is a TIM message that is transmitted immediately prior to the final TIM message.

13. The UE of claim 10, wherein the one or more processors are further configured to transmit a PS_Poll frame to the AP, wherein the PS_Poll frame comprises a request to retrieve a buffered Downlink (DL) data for the UE.

14. The UE of claim 13, wherein the PS_Poll frame is transmitted on a DRX On duration that is configured by the DRX configuration.

15. The UE of claim 10, wherein the one or more processors are further configured to transmit an uplink data packet to the AP during a DRX active time, wherein the DRX active time includes at least one subframe that the UE monitors for a Downlink transmission from the base station.

16. The UE of claim 10, wherein the last TIM message indicates whether the AP buffers downlink data for the UE.

17. A user equipment (UE), comprising:
one or more processors configured to:
receive, from a base station, a DRX configuration;
in response to receiving the DRX configuration from the base station, determine a WLAN power saving configuration based on the DRX configuration, wherein the WLAN power saving configuration comprises a listen interval, the listen interval includes one or more Traffic Indication Map (TIM) transmission periods, each of the one or more TIM transmission periods includes a TIM message, a last TIM message in the listen interval is determined such that no TIM message exists between the last TIM message and an expiration of the WLAN listen interval, and the last TIM transmission period associated with the last TIM message overlaps a DRX On duration of the DRX configuration, and the UE turns off a WLAN circuit component of the UE for TIM transmission periods in the WLAN listen interval other than the last TIM transmission period, and activates the WLAN circuit component of the UE for the last TIM transmission period; and
transmit, to an Access Point (AP), the WLAN power saving configuration.

18. A user equipment (UE), comprising:
one or more processors configured to:
transmit, to a base station, a DRX configuration request, wherein the DRX configuration request comprises a DRX assistance report that is based on a WLAN power saving configuration, wherein the WLAN power saving configuration comprises a listen interval, the listen interval includes one or more Traffic Indication Map (TIM) transmission periods, each of the one or more TIM transmission periods includes a TIM message, and a last TIM message in the listen interval is determined such that no TIM message exists between the last TIM message and an expiration of the WLAN listen interval;
receive, from the base station, a DRX configuration, wherein the DRX configuration is determined based on the DRX assistance report and includes a DRX On duration that overlaps the last TIM transmission period associated with the last TIM message, wherein the UE turns off a WLAN circuit component of the UE for TIM transmission periods in the WLAN listen interval other than the last TIM transmission period, and activates the WLAN circuit component of the UE for the last TIM transmission period; and
configure at least one DRX cycle based on the DRX configuration.

19. An apparatus comprising instructions embodied on a tangible, non-transitory computer-readable medium, the instructions operable when executed to cause a computing system to perform operations comprising:
receiving, from a base station, at a user equipment (UE), a Discontinuous Reception (DRX) configuration;
determining a WLAN listen interval that includes one or more Traffic Indication Map (TIM) transmission periods, wherein each of the one or more TIM transmission periods includes a TIM message;
determining a last TIM message in the WLAN listen interval, wherein no TIM message exists between the last TIM message and an expiration of the WLAN listen interval;
determining that the last TIM transmission period associated with the last TIM message overlaps on a DRX On duration of the DRX configuration; and
in response to determining the last TIM message in the WLAN listen interval and that the last TIM transmission period overlaps on the DRX On duration of the DRX configuration:
selecting the last TIM message to monitor;
turning off a WLAN circuit component of the UE for TIM transmission periods in the WLAN listen interval other than the last TIM transmission period;
activating the WLAN circuit component of the UE for the last TIM transmission period and activating a long term evolution (LTE) circuit component of the UE for the DRX On duration of the DRX configuration;
during the last TIM transmission period, receiving, from an Access Point (AP), the last TIM message.

20. An apparatus comprising instructions embodied on a tangible, non-transitory computer-readable medium, the instructions operable when executed to cause a computing system to perform operations comprising:
receiving, from a base station, at a user equipment (UE), a DRX configuration;
in response to receiving the DRX configuration from the base station, determining, at the UE, a WLAN power saving configuration based on the DRX configuration, wherein the WLAN power saving configuration comprises a listen interval, the listen interval includes one or more Traffic Indication Map (TIM) transmission periods, each of the one or more TIM transmission periods includes a TIM message, a last TIM message in the listen interval is determined such that no TIM message exists between the last TIM message and an expiration of the WLAN listen interval, and the last TIM transmission period associated with the last TIM message overlaps a DRX On duration of the DRX configuration, and the UE turns off a WLAN circuit component of the UE for TIM transmission periods in the WLAN listen interval other than the last TIM transmission period, and activates the WLAN circuit component of the UE for the last TIM transmission period; and transmitting, to an Access Point (AP), the WLAN power saving configuration.

21. An apparatus comprising instructions embodied on a tangible, non-transitory computer-readable medium, the instructions operable when executed to cause a computing system to perform operations comprising:

transmitting, to a base station, a DRX configuration request, wherein the DRX configuration request comprises a DRX assistance report that is based on a WLAN power saving configuration, wherein the WLAN power saving configuration comprises a listen interval, the listen interval includes one or more Traffic Indication Map (TIM) transmission periods, each of the one or more TIM transmission periods includes a TIM message, and a last TIM message in the listen interval is determined such that no TIM message exists between the last TIM message and an expiration of the WLAN listen interval;

receiving, from the base station, a DRX configuration, wherein the DRX configuration is determined based on the DRX assistance report and includes a DRX On duration that overlaps the last TIM transmission period associated with the last TIM message, wherein the UE turns off a WLAN circuit component of the UE for TIM transmission periods in the WLAN listen interval other than the last TIM transmission period, and activates the WLAN circuit component of the UE for the last TIM transmission period; and configuring at least one DRX cycle based on the DRX configuration.

* * * * *